(12) United States Patent
Hoffmann et al.

(10) Patent No.: US 6,381,591 B1
(45) Date of Patent: Apr. 30, 2002

(54) METHOD FOR TRANSFORMATION OF FUZZY LOGIC, WHICH IS USED TO SIMULATE A TECHNICAL PROCESS, INTO A NEURAL NETWORK

(75) Inventors: Wolfgang Hoffmann; Erik Schwulera, both of Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/365,779

(22) Filed: Aug. 3, 1999

Related U.S. Application Data

(63) Continuation of application No. PCT/DE98/00260, filed on Jan. 29, 1998.

(30) Foreign Application Priority Data

Feb. 3, 1997 (DE) .......................... 197 03 964

(51) Int. Cl.$^7$ .......................... G06F 15/18; G05B 13/02
(52) U.S. Cl. .............................. 706/2; 706/5; 706/900; 700/48; 700/50
(58) Field of Search .......................... 700/48, 50; 706/2, 706/5, 6, 7, 8, 9, 52, 900

(56) References Cited

U.S. PATENT DOCUMENTS

| 5,357,449 A | * 10/1994 | Oh .......................... 702/188 |
| 5,579,439 A |   11/1996 | Khan |
| 5,839,114 A | * 11/1998 | Lynch et al. .................... 705/5 |
| 5,852,708 A | * 12/1998 | Shyu et al. ..................... 706/9 |

FOREIGN PATENT DOCUMENTS

| DE | 195 28 984 C1 | 9/1996 |
| WO | 93/21598 | 10/1993 |

OTHER PUBLICATIONS

Chin–Teng Lin and Ya–Ching Lu, "A Neural Fuzzy System with Linguistic Teaching Signals", IEEE Transactions on Fuzzy Systems, vol. 3, No. 2, May 1995, pp. 169–189.*

Lin, Chin–Teng et al., "A Neural Fuzzy System with Fuzzy Supervised Learning," IEEE Transactions on Systems: Man and Cybernetics—Part B: Cybernetics, V26, N5, Oct. 1996, pp. 744–763.

Vourimaa, Petri et al., "A Neuro–Fuzzy System for Chemical Agent Detection," IEEE Transactions on Fuzzy Systems, V3, N4, Nov. 1995, pp. 415–424.

Hensel, Hartmut et al., "Optimierung von Fuzzy–Control mit Hilfe Neuronaler Netze," atp Automatisierungstechnische Praxis, V37, N11, 1995, pp. 40–48. (with partial translation).

* cited by examiner

Primary Examiner—William Grant
Assistant Examiner—Elliot Frank
(74) Attorney, Agent, or Firm—Sughrue Mion, PLLC

(57) ABSTRACT

A method for transformation of fuzzy logic (FS) into a neural network (NN), in which, in order to form a defuzzified output value (y2) from normalized single-element functions (F1 . . . Fm), the single-element functions (F1 . . . Fm) are each assigned a singleton position (A1 . . . Am) and at least one singleton weighting factor (R1 . . . Rn), those singleton weighting factors (R1 . . . Rn) which are assigned to the same single-element function (F1 . . . Fm) are additively linked, and the singleton weighting factors (R1 . . . Rn) and the additively linked singleton weighting factors (R1 . . . Rn) are weighted via the corresponding singleton positions (A1 . . . Am) and are additively linked in order to form the defuzzified output value (y2). One advantage of the method according to the invention is that the singleton positions (A1 . . . Am) in the neural network (NN) can be varied, in order to optimize this network, such that their number before and after the optimization process remains constant and thus, in any case, subsequent reverse transformation of the neural network (NN) can be carried out to optimize fuzzy logic (FS). This advantageously allows the use of, in particular, standardized fuzzy system software to describe the optimized fuzzy logic (FS).

8 Claims, 2 Drawing Sheets

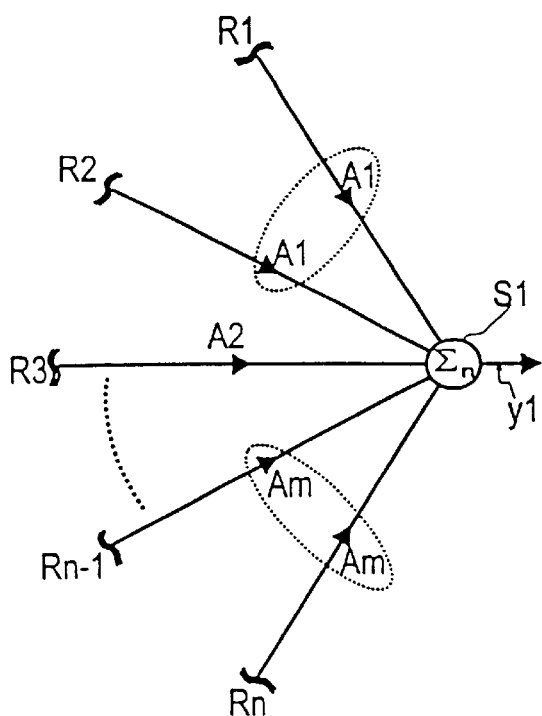
FIG 4a
CONVENTIONAL
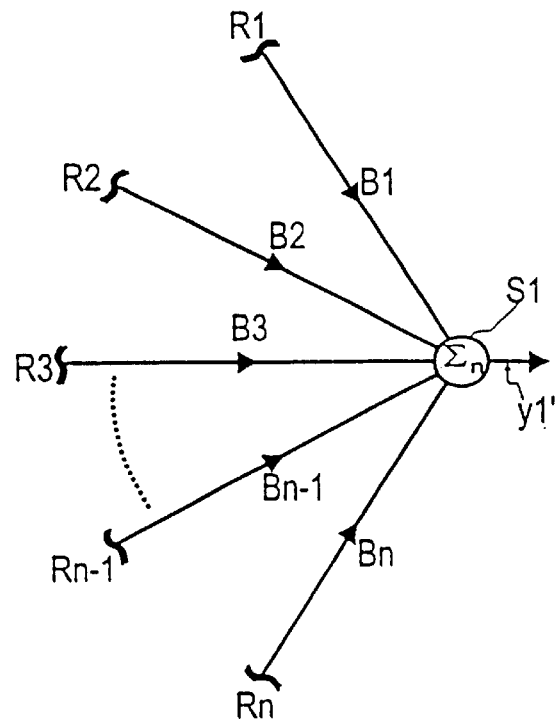
FIG 4b
CONVENTIONAL
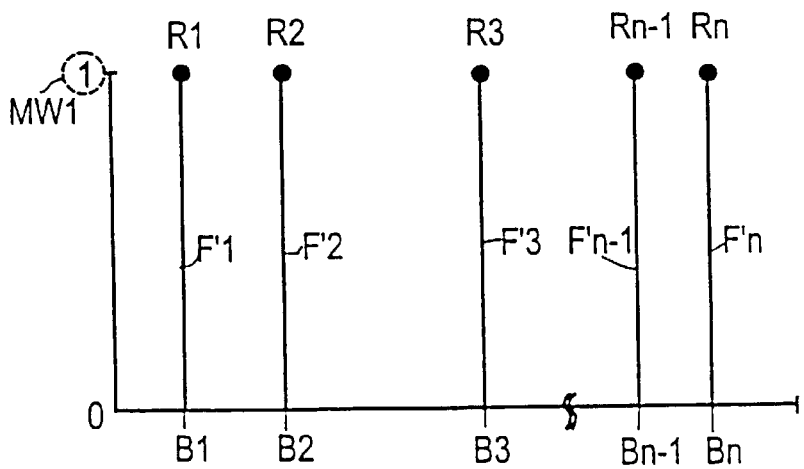
FIG 5   CONVENTIONAL

METHOD FOR TRANSFORMATION OF FUZZY LOGIC, WHICH IS USED TO SIMULATE A TECHNICAL PROCESS, INTO A NEURAL NETWORK

This is a Continuation of International Application PCT/DE98/00260, with an international filing date of Jan. 29, 1998, the disclosure of which is incorporated into this application by reference.

FIELD OF AND BACKGROUND OF THE INVENTION

The invention relates to new and useful improvements to the transformation of fuzzy logic, which is used to simulate a technical process, into a neural network.

In neuro-fuzzy systems, the input/output response of fuzzy systems can be optimized using neural networks. This makes it possible to compensate for the disadvantages of fuzzy systems and those of neural networks. One option for using a neural network to optimize a fuzzy system is to transform a fuzzy system into a neural network, which is then trained using input/output measured values. While the system response of the technical process that is to be simulated can be reflected in the fuzzy system, the transformation into a neural network allows additional optimization using input/output measured values from the technical process to be simulated. In this case, the optimization process can be automated using optimization algorithms, which can be executed by the neuro-fuzzy system using a computer.

Various methods are known for transforming the components of a fuzzy system into the structures of a neural network. In particular, a fuzzy system has fuzzy logic which, as a rule, is composed of the three components "fuzzification", "control" and "defuzzification". The three components can each be modeled using specific types of neurons. The fundamental design of a neuro-fuzzy system, i.e., the individual components of the fuzzy logic within a neuro-fuzzy network, is shown in FIG. 1. When the fuzzy logic FS is being transformed into the neural network NN, the fuzzification F, control base R and defuzzification D components in the neural network NN are represented as a neural fuzzification network NF, a neural control base network NR and a neural defuzzification network ND.

As a result of linguistic rules in the fuzzy logic FS, the control base R component, in particular, results in a number of linguistic values being emitted to the defuzzification D component. The result of a linguistic rule is always a linguistic value. The linguistic values, which are preferably single-element functions, are then united in the defuzzification D component, by defuzzification, to form a single, "sharp" value.

By way of example, FIG. 2 shows single-element functions F1, F2 ... Fm of the type which, as a rule, are first normalized with respect to a first maximum value MW1 of magnitude 1. A singleton position A1, A2 ... Am and at least one singleton weighting factor R1, R2, R3 ... Rn−1 are respectively assigned to the single-element functions F1 .. . Fm, which are also called "singletons".

The singleton positions A1 ... Am represent, in particular, the result of rules contained in the control base R component of the fuzzy logic FS. This corresponds in particular to the "THEN" part of so-called linguistic "IF—THEN" rules, such as "IF pressure high, THEN explosion hazard high". The singleton positions A1 ... Am may lie in any desired value range.

The singleton weighting factors R1 ... Rn correspond in particular to the weighting of the "THEN" part of a linguistic rule in the control base R component of the fuzzy logic FS. The singleton weighting factors R1 ... Rn are in this case used to weight the single-element functions F1 ... Fm, and one single-element function F1 ... Fm can also be assigned a number of singleton weighting factors R1 ... Rn. For example, the weighting factors of the rules "IF pressure high, THEN explosion hazard high" and "IF temperature high, THEN explosion hazard high" both relate to the same single-element function "explosion hazard" with the singleton position "high". In the example in FIG. 2, the two singleton weighting factors R1 and R2 are assigned to the single-element function F1 having the singleton position A1.

The singleton positions A1 ... Am (weighted with the singleton weighting factors R1 ... Rn) of the single-element functions F1 ... Fm are unified, to form a single value y, in the defuzzification D component of the fuzzy logic FS, by defuzzification. This is done, for example, using the so-called height method:

$$y = \frac{\sum_{v=1}^{n} Rv \cdot A(v)}{\sum_{v=1}^{n} Rv} = \frac{y1}{\sum_{v=1}^{n} Rv}$$

By way of example, FIG. 4a shows conventional modeling of the fuzzy logic FS in the neural network NN. An output signal y1 is formed by addition, via a summing neuron S1, from the singleton positions A1 ... Am weighted with the singleton weighting factors R1 ... Rn. In this case, each weighting factor R1 ... Rn is assigned:

$$y1 = (R1 \cdot A1) + (R2 \cdot A1) + (R3 \cdot A2) + \ldots + (Rn \cdot Am)$$

for weighting the corresponding singleton position A1 ... Am. A disadvantage of this transformation method is that one singleton position A1 ... Am is in each case assigned to each singleton weighting factor R1 ... Rn for summing by the summing neuron S1. While there is one degree of freedom of m singleton positions A1 ... Am in the fuzzy logic FS, the neural network NN generally has many degrees of freedom n for the singleton weighting factors R1 ... Rn.

FIG. 4b shows how the singleton positions A1 ... Am of the weighting factors R1 ... Rn are optimized during the training of the neural network NN that is carried out following the transformation. In this case, the values of the individual singleton positions A1 ... Am are varied. In comparison with a number m of singleton positions A1 ... Am before optimization, this results in the number n>=m of optimized singleton positions B1 ... Bn after the optimization process. The optimized neural network NN thus generally has more degrees of freedom n than before the optimization in order to form the output signal y1'.

FIG. 5 shows the single-element functions F'1 ... F'n transformed back by reverse transformation of the neural network NN into an optimized fuzzy system FS. While the number of single-element functions F1 ... Fm was m before the transformation, the fuzzy system FS after reverse transformation disadvantageously now has n single-element functions F'1 ... F'n. As a rule, n>=m, which means that there are usually more single-element functions after reverse transformation than there were before the transformation.

It is disadvantageous that, for example, this may lead to such a neuro-fuzzy system no longer being feasible on standardized, conventionally available fuzzy system software after the optimization process, since such software allows only a specific maximum number of degrees of freedom, that is to say such software can process only a maximum number of singleton positions or single-element functions.

OBJECT OF THE INVENTION

It is therefore a first object of the invention to provide an improved method for transformation of fuzzy logic into a neural network. It is a further, specific object to provide such a method, in which the singleton positions (A1 . . . Am) in the neural network (NN) can be adjusted, in order to optimize this network, such that their number before and after the optimization process remains constant and thus, in any case, subsequent reverse transformation of the neural network (NN) can be carried out to optimize fuzzy logic (FS). This advantageously allows the use of, in particular, standardized fuzzy system software to describe the optimized fuzzy logic (FS).

SUMMARY OF THE INVENTION

According to one formulation of the invention, these and other objects are achieved by a method for transforming fuzzy-logic, which is used to simulate a technical process, into a neural network in order to form a defuzzified output value from normalized single-element functions. This method includes:

- assigning a singleton position and at least one singleton weighting factor to each of the normalized single-element functions, wherein each of the normalized single-element functions is assigned either a single singleton weighting factor or a group of singleton weighting factors, with at least one of said normalized single-element functions being assigned one such group of singleton weighting factors;
- additively linking the singleton weighting factors within each of a plurality of the group of singleton weighting factors, to produce additively linked singleton weighting factors for respective normalized single-element functions;
- weighting the single singleton weighting factors and the additively linked singleton weighting factors via corresponding singleton positions; and
- additively linking the single singleton weighting factors and the additively linked singleton weighting factors, weighted by the corresponding singleton positions, in order to form the defuzzified output value.

Particularly advantageous refinements of the invention are described in the specification and claimed in various dependent claims.

One advantage of the method according to the invention is that fuzzy logic can be transformed, in particular component-by-component, into a neural network, which can then be optimized as a totality, that is to say by optimizing all the components jointly. Thus, in addition to the system response which can be considered in the fuzzy logic, such as the number of association functions to be used, measurement data relating to the technical process to be simulated can also be introduced into the optimization process for the neural network.

The method according to the invention for transformation of fuzzy logic, which is used to simulate a technical process, into a neural network, has the further advantage that the optimization of the neural network and the corresponding reverse transformation do not change the number of degrees of freedom of the fuzzy logic. In particular, the number of single-element functions or "singletons" present in the defuzzification component of the fuzzy logic advantageously remains unchanged. It is advantageous that, owing to the transformation method according to the invention, the singleton positions A1 . . . Am in the neural network can be varied during its optimization only in such a way that their number remains constant, and the neural network can thus always subsequently be transformed back into optimized fuzzy logic. This advantageously allows standardized fuzzy-system software, in particular, to be used to describe the optimized fuzzy logic.

BRIEF DESCRIPTION OF THE DRAWINGS

The invention and further advantageous refinements of the invention according to the features of the dependent claims are explained in more detail below with the aid of diagrammatic, exemplary embodiments in the drawing, in which:

FIG. 4a shows, by way of example, the flowchart of a conventional transformation method in the neural network, before its optimization, FIG. 4b shows, by way of example, the flowchart from FIG. 4a after the optimization of the neural network by variation of the individual singleton positions, and FIG. 5 shows, by way of example, single-element functions of a fuzzy logic system, which has been transformed into a neural network, optimized and then transformed back again by means of a conventional method.

DETAILED DESCRIPTION OF THE PREFERRED EMBODIMENTS

Figure 1:
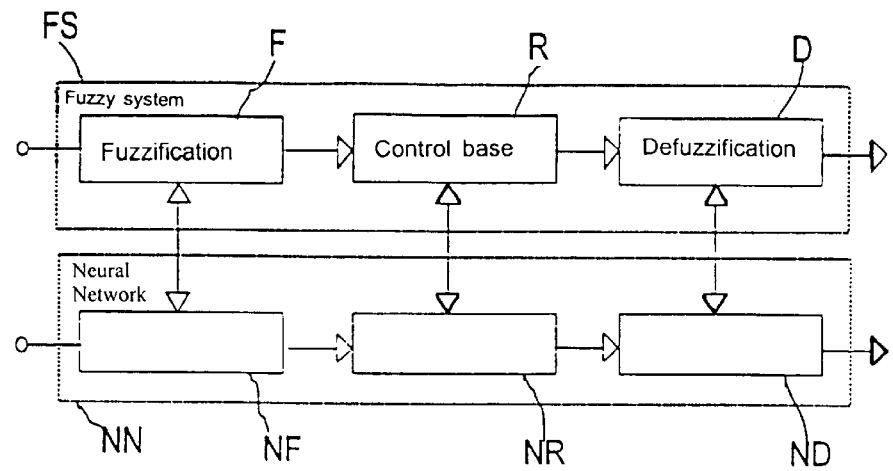
FIG. 1 shows, by way of example, the individual components of the fuzzy logic system and of the associated neural network in a neuro-fuzzy system.
Figure 2:
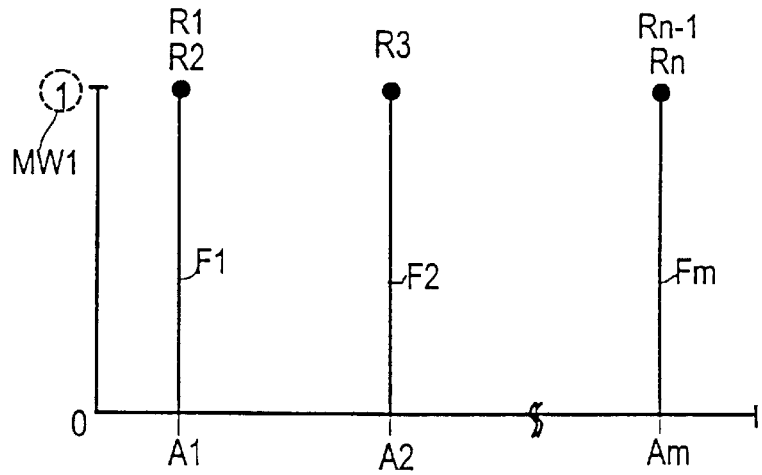
FIG. 2 shows, by way of example, single-element functions of the fuzzy logic, to each of which a singleton position and at least one singleton weighting factor are assigned.
Figure 3:
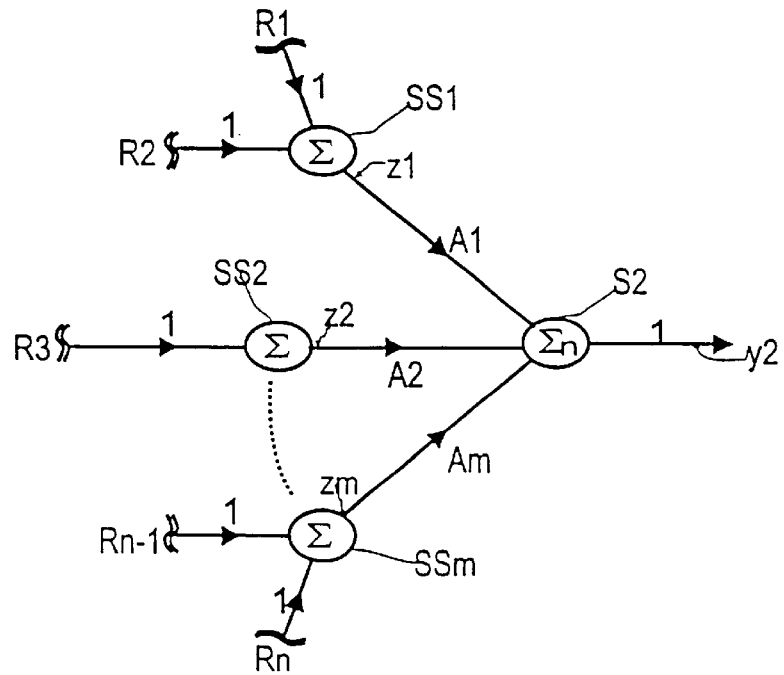
FIG. 3 shows, by way of example, a flowchart of the transformation method according to the invention in the neural network, by means of secondary neurons and main neurons.

The flowchart in FIG. 3 shows the method according to the invention for transformation of fuzzy logic FS, used to simulate a technical process, into a neural network NN. In order to form a defuzzified output value y2 in the neural network NN, from normalized single-element functions F1 . . . Fm shown in FIG. 2, these functions are each assigned a singleton position A1 . . . Am and at least one singleton weighting factor R1 . . . Rn. The number of single-element functions F1 . . . Fm or singleton positions A1 . . . Am is thus no greater than the number of singleton weighting factors R1 . . . Rn. As is shown in FIG. 3, the first step in forming the output value y2 is to additively link those singleton weighting factors R1 . . . Rn which are assigned to the same single-element function F1 . . . Fm. The singleton weighting factors R1 . . . Rn and the additively linked singleton weighting factors R1 . . . Rn are weighted with the corresponding singleton positions A1 . . . Am, and are additively linked in order to form the defuzzified output value y2. In particular, the neural network NN, as a component, in this case has a neural defuzzification network NF (which is shown by way of example in FIG. 1) for forming a defuzzified output value y2 from the single-element functions F1 . . . Fm.

Thus, according to the invention, those singleton weighting factors R1 . . . Rn which are assigned to the same singleton position A1 . . . Am are first combined. Those singleton weighting factors R1 . . . Rn which are singly assigned to a single singleton position A1 . . . Am, and the already combined singleton weighting factors R1 . . . Rn, are then weighted with the corresponding singleton position A1

... Am, and are additively linked in order to form the output value y2. Thus, in the example from FIG. 3, related to FIG. 2, the output value y2 is thus formed by:

$$y2=(R1+R2)\cdot A1+(R3)\cdot A2+\ldots+(Rn-1+Rn)\cdot Am$$

In a further advantageous embodiment of the method according to the invention, which is likewise illustrated with reference to FIG. 2 and in FIG. 3, the single-element functions F1 ... Fm are respectively assigned a secondary neuron SS1 ... SSm. The singleton weighting factors R1 ... Rn assigned to the single-element functions F1 ... Fm are thus assigned to the corresponding secondary neurons SS1 ... SSm. Furthermore, those singleton weighting factors R1 ... Rn which are assigned to the same single-element function F1 ... Fm, i.e., to the same secondary neuron SS1 ... SSm, are respectively additively linked via the corresponding secondary neurons SS1 ... SSm. According to the invention, the secondary neurons SS1 ... SSm respectively have, in particular, one output signal z1 ... zm, with the singleton positions A1 ... Am being used for weighting the corresponding output signals z1 ... zm of the secondary neurons SS1 ... SSm. The weighted output signals z1 ... zm of the secondary neurons SS1 ... SSm are additively linked via a main neuron S2 to form the defuzzified output value y2.

The additive linking (which takes place initially, according to the invention) of those singleton weighting factors R1 ... Rn which are assigned to the same secondary neuron SS1 ... SSm enables the number m of optimization operations on singleton positions A1 ... Am carried out during optimization of the neural network NN to advantageously remain the same. After reverse transformation of the optimized neural network NN into a thereby optimized fuzzy logic FS, this fuzzy logic has the number m of single-element functions F1 ... Fm with correspondingly optimized values of the singleton positions A1 ... Am.

The method according to the invention can advantageously be carried out by means of an apparatus in which the secondary neurons SS1 ... SSm shown in FIG. 3 and the main neuron S2 are summing neurons. These can be provided, in particular, by means of a hardware circuit, a software program or a combination of hardware and software.

The above description of the preferred embodiments has been given by way of example. From the disclosure given, those skilled in the art will not only understand the present invention and its attendant advantages, but will also find apparent various changes and modifications to the methods and systems disclosed. It is sought, therefore, to cover all such changes and modifications as fall within the spirit and scope of the invention, as defined by the appended claims, and equivalents thereof.

What is claimed is:

1. A method for transformation of fuzzy-logic, which is used to simulate a technical process, into a neural network in order to form a defuzzified output value from normalized single-element functions, said method comprising:
   a) assigning a singleton position and at least one singleton weighting factor to each of said normalized single-element functions, wherein each of said normalized single-element functions is assigned either a single singleton weighting factor or a group of singleton weighting factors, with at least one of said normalized single-element functions being assigned one such group of singleton weighting factors;
   b) additively linking said singleton weighting factors within each said group of singleton weighting factors, to produce additively linked singleton weighting factors for respective normalized single-element functions;
   c) weighting said single singleton weighting factors and said additively linked singleton weighting factors via corresponding ones of said singleton positions; and
   d) additively linking said single singleton weighting factors and said additively linked singleton weighting factors, weighted by said corresponding singleton positions, in order to form said defuzzified output value.

2. The method as claimed in claim 1, further comprising:
   a) assigning a corresponding secondary neuron to each of said normalized single-element functions;
      wherein in said step b), said singleton weighting factors within each said group of singleton weighting factors are additively linked via corresponding secondary neurons, wherein in said step b) said corresponding secondary neurons output corresponding secondary neuron output signals;
      wherein in said step c) said corresponding singleton positions are used for weighting said corresponding secondary neuron output signals of said corresponding secondary neurons to form weighted secondary neuron output signals, and wherein in said step d) said weighted secondary neuron output signals are additively linked via a main neuron to form said defuzzified output value.

3. A method as claimed in claim 2, wherein said corresponding secondary neurons and said main neuron are summing neurons.

4. An apparatus for transforming fuzzy-logic, which is used to simulate a technical process, into a neural network in order to form a defuzzified output value from normalized single-element functions, said apparatus comprising:
   a) an assignment section for assigning a singleton position and at least one singleton weighting factor to each of said normalized single-element functions, wherein each of said normalized single-element functions is assigned either a single singleton weighting factor or a group of singleton weighting factors, with at least one of said normalized single-element functions being assigned one such group of singleton weighting factors;
   b) a first combination section for additively linking said singleton weighting factors within each said group of singleton weighting factors, to produce additively linked singleton weighting factors for respective normalized single-element functions;
   c) a weighting section for weighting said single singleton weighting factors and said additively linked singleton weighting factors via corresponding ones of said singleton positions; and
   d) a second combination section for additively linking said single singleton weighting factors and said additively linked singleton weighting factors, weighted by said corresponding singleton positions, in order to form said defuzzified output value.

5. An apparatus as claimed in claim 4, wherein said neural network further comprises:
   a neural defuzzification network component for forming said defuzzified output value from said normalized single-element functions.

6. An apparatus for transforming fuzzy-logic, which is used to simulate a technical process, into a neural network in order to form a defuzzified output value from normalized single-element functions, said apparatus comprising:

a) an assignment unit for assigning a singleton position and at least one singleton weighting factor to each of said normalized single-element functions, wherein each of said normalized single-element functions is assigned either a single singleton weighting factor or a group of singleton weighting factors, with at least one of said normalized single-element functions being assigned one such group of singleton weighting factors;

b) corresponding secondary neurons for additively linking said singleton weighting factors within each said group of singleton weighting factors, wherein said corresponding secondary neurons output corresponding secondary neuron output signals, wherein said assignment unit further assigns a corresponding secondary neuron to each of said normalized single-element functions;

c) a secondary neuron output signal weighting unit for weighting said corresponding secondary neuron output signals of said corresponding secondary neurons, via corresponding ones of said singleton positions, in order to form weighted secondary neuron output signals; and d) a main neuron for additively linking said weighted secondary neuron output signals in order to form said defuzzified output value.

7. An apparatus as claimed in claim 6, wherein said corresponding secondary neurons and said main neuron are summing neurons.

8. An apparatus as claimed in claim 6, wherein said neural network further comprises:

a neural defuzzification network component for forming said defuzzified output value from said normalized single-element functions.

* * * * *